United States Patent
Wu

(10) Patent No.: US 9,351,298 B2
(45) Date of Patent: May 24, 2016

(54) SERVICE DATA SCHEDULING METHOD, BASE STATION, AND BASE STATION CONTROLLER

(71) Applicant: HUAWEI TECHNOLOGIES CO., LTD., Shenzhen (CN)

(72) Inventor: Zhenxing Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 14/090,992

(22) Filed: Nov. 26, 2013

(65) Prior Publication Data

US 2014/0086181 A1 Mar. 27, 2014

Related U.S. Application Data

(63) Continuation of application No. PCT/CN2012/076273, filed on May 30, 2012.

(30) Foreign Application Priority Data

Jun. 1, 2011 (CN) .......................... 2011 1 0146766

(51) Int. Cl.
*H04W 72/04* (2009.01)
*H04W 74/04* (2009.01)
(Continued)

(52) U.S. Cl.
CPC ......... *H04W 72/0433* (2013.01); *H04L 63/105* (2013.01); *H04W 12/08* (2013.01); *H04W 72/1247* (2013.01); *H04W 74/04* (2013.01)

(58) Field of Classification Search
CPC .......................... H04W 72/0433; H04W 74/04
USPC .......................................................... 370/329
See application file for complete search history.

(56) References Cited

U.S. PATENT DOCUMENTS 9,072,040 B2 * 6/2015 Fang .................... H04W 12/06
2004/0123326 A1 * 6/2004 Makofka ...................... 725/100
(Continued)

FOREIGN PATENT DOCUMENTS

CN 101453762 A 6/2009
CN 101527965 A 9/2009
(Continued)

OTHER PUBLICATIONS

PCT International Search Report and Written Opinion of the International Searching Authority mailed Sep. 13, 2012 in corresponding International Application No. PCT/CN/2012/076273.
(Continued)

*Primary Examiner* — Rasheed Gidado
(74) *Attorney, Agent, or Firm* — Staas & Halsey LLP

(57) ABSTRACT

Embodiments of the present invention disclose a service data scheduling method and related devices. The method includes: receiving a service attribute message; obtaining a user priority of a UE according to the service attribute message and attribute information of each service corresponding to service data of the UE that is cached locally; granting authorization to the UE according to user priority of the UE; granting authorization to each service of the UE according to the authorization granted to the UE and the service priority of the service of the UE; and sending authorization information of the each service corresponding to the service data of the UE that is cached in the base station controller to the base station controller. When the service data of the same user is cached in the base station and the base station controller in a distributed way, service data scheduling for a user is implemented.

20 Claims, 5 Drawing Sheets

(51) Int. Cl.
*H04W 72/12* (2009.01)
*H04L 29/06* (2006.01)
*H04W 12/08* (2009.01)

(56) References Cited

U.S. PATENT DOCUMENTS

| | | |
|---|---|---|
| 2005/0079865 A1* | 4/2005 | Ahn et al. .................... 455/434 |
| 2005/0259662 A1 | 11/2005 | Kim et al. |
| 2007/0070894 A1 | 3/2007 | Wang et al. |
| 2007/0268959 A1* | 11/2007 | Bi et al. ........................ 375/146 |
| 2008/0081637 A1* | 4/2008 | Ishii et al. .................... 455/453 |
| 2009/0191882 A1* | 7/2009 | Kovacs et al. ............... 455/450 |
| 2009/0311989 A1* | 12/2009 | Duan et al. ................... 455/406 |
| 2010/0002629 A1 | 1/2010 | Moussa |
| 2010/0017846 A1* | 1/2010 | Huang et al. .................... 726/1 |
| 2010/0248771 A1* | 9/2010 | Brewer et al. ................ 455/518 |
| 2011/0044262 A1* | 2/2011 | Satapathy et al. ............ 370/329 |

FOREIGN PATENT DOCUMENTS

| | | |
|---|---|---|
| CN | 101657020 A | 2/2010 |
| CN | 102202411 A | 9/2011 |
| WO | 2006/093350 A1 | 9/2006 |

OTHER PUBLICATIONS

Extended European Search Report mailed Sep. 3, 2014, in corresponding European Patent Application No. 12794131.8.
International Search Report mailed Sep. 13, 2012 in corresponding International Application No. PCT/CN2012/076273.

* cited by examiner

SERVICE DATA SCHEDULING METHOD, BASE STATION, AND BASE STATION CONTROLLER

CROSS-REFERENCE TO RELATED APPLICATION

This application is a continuation of International Application No. PCT/CN2012/076273, filed on May 30, 2012, which claims priority to Chinese Patent Application No. 201110146766.7, filed on Jun. 1, 2011, both of which are hereby incorporated by reference in their entireties.

TECHNICAL FIELD

The present invention relates to the communications field, and in particular, to a service data scheduling method, a base station, and a base station controller.

BACKGROUND

The explosive growth in mobile services imposes much pressure on operators in network expansion. In order to reduce the bandwidth consumption of transmission networks of the core network and the radio access network (RAN, Radio Access Network), reduce operating costs of services, and implement differentiated quality of service (QoS, Quality of Service), network are evolving toward flat structures.

In a conventional radio communication system, all service data is cached in a base station controller, and a specific process of scheduling the service data is as follows:

A base station controller computes a user priority for each user according to information such as service types and service priorities of all services of each user; the base station controller sends the computed user priority to a base station; the base station authorizes each user (that is, grants an air interface bandwidth to each user) according to the user priority and the air interface channel environment, and returns an authorization result to the base station controller; the base station controller authorizes the services of each user (that is, grants an air interface bandwidth to each service) based on an authorization state of the user, and sends service data of the user to the base station according to an authorization result; and the base station sends the service data to a user equipment (UE, User Equipment) over the air interface.

However, in order to implement network expansion, a local breakout (LBO, Local Breakout) function is implemented on a base station at present, that is, most low-priority services are directly distributed from the base station to an Ethernet. In such a scenario, service data is not completely cached in a base station controller, and service data of one user may be partially cached in a base station controller, and partially cached in a base station. It can be seen that the existing service data scheduling method is not suitable for the scenario, and cannot solve the service data scheduling problem in such a scenario.

SUMMARY

Embodiments of the present invention provide a service data scheduling method, a base station, and a base station controller, which are used to implement service data scheduling for a user when service data of the user is distributed in both a base station and a base station controller.

In one aspect, an embodiment of the present invention provides a service data scheduling method, including: receiving a service attribute message sent by a base station controller, where the service attribute message includes attribute information of each service corresponding to service data pertaining to a same user equipment UE that is cached in the base station controller, and the attribute information includes a service type and a service priority; obtaining a user priority of the UE according to the service attribute message and attribute information of each service corresponding to service data of the UE that is cached locally in a base station; granting authorization to the UE according to the user priority of the UE; granting authorization to each service of the UE according to the authorization granted to the UE and a service priority of each service of the UE; and sending authorization information of each service corresponding to the service data of the UE that is cached in the base station controller to the base station controller.

In another aspect, an embodiment of the present invention provides a service data scheduling method, including: receiving a service attribute message sent by a base station, where the service attribute message includes attribute information of each service corresponding to service data that is pertaining to a same user equipment UE and cached in the base station, and the attribute information includes a service type and a service priority; obtaining a user priority of the UE according to the received service attribute message and attribute information of each service corresponding to service data of the UE that is cached locally in a base station controller; sending the user priority of the UE to the base station, so that the base station grants authorization to the UE by using the user priority; receiving a user authorization message sent by the base station, where the user authorization message includes authorization information of the UE; granting authorization to each service of the UE according to the authorization information of the UE and a service priority of each service of the UE; and sending authorization information of each service corresponding to the service data of the UE that is cached in the base station to the base station.

In still another aspect, an embodiment of the present invention provides a base station, including: a receiving unit, configured to receive a service attribute message sent by a base station controller, where the service attribute message includes attribute information of each service corresponding to service data that is pertaining to a same user equipment UE and cached in the base station controller, and the attribute information includes a service type and a service priority; an obtaining unit, configured to obtain a user priority of the UE according to the service attribute message received by the receiving unit and attribute information of each service corresponding to service data of the UE that is cached locally; an authorizing unit, configured to grant authorization to the UE according to the user priority of the UE obtained by the obtaining unit, and configured to grant authorization to each service of the UE according to the authorization granted to the UE and a service priority of each service of the UE; and a sending unit, configured to send authorization information of each service corresponding to the service data of the UE that is cached in the base station controller to the base station controller.

In yet another aspect, an embodiment of the present invention provides a base station controller, including: a receiving unit, configured to receive a service attribute message sent by a base station, where the service attribute message includes attribute information of each service corresponding to service data that is pertaining to a same user equipment UE and cached in the base station, and the attribute information includes service a type and a service priority; an obtaining unit, configured to obtain a user priority of the UE according to the attribute information received by the receiving unit and attribute information of each service corresponding to service data of the UE that is cached locally; a sending unit, configured to send the user priority of the UE that is obtained by the obtaining unit to the base station; the receiving unit, further configured to receive a user authorization message sent by the base station, where the user authorization message includes authorization information of the UE; an authorizing unit, configured to grant authorization to each service of the UE according to the authorization information of the UE and a service priority of each service of the UE; and the sending unit, further configured to send the authorization information of each service corresponding to the service data of the UE that is cached in the base station to the base station.

As can be seen from above, in the embodiments of the present invention, the base station cooperates with the base station controller, that is, the base station controller sends attribute information of each service corresponding to locally cached service data to the base station (or the base station sends attribute information of each service corresponding to locally cached service data to the base station controller), so that the base station (or the base station controller) can grant authorization to each service, thereby implementing service data scheduling for a user when service data of the user is distributed and cached in the base station and the base station controller.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the invention objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
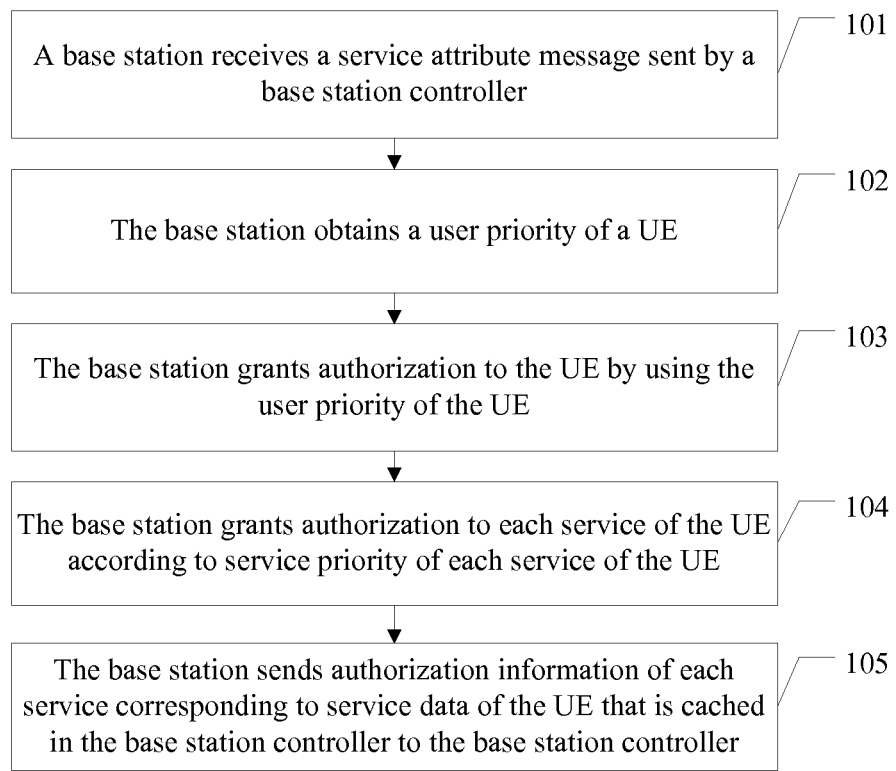
FIG. 1 is a schematic flowchart of a service data scheduling method according to an embodiment of the present invention.

The following describes a service data scheduling method in the embodiments of the present invention. Referring to FIG. 1, a service data scheduling method according to an embodiment of the present invention includes the following steps:

101. A base station receives a service attribute message sent by a base station controller.

The service attribute message includes attribute information, such as a service type, a service priority, and a cached data size of service, of each service corresponding to service data that is pertaining to a same UE and cached in the base station controller.

It should be noted that the UE is a UE that requires the base station to schedule service data of the UE.

In an actual application, the base station controller may send the service attribute message of the UE to the base station by using a dedicated link of the UE, and the base station may receive the service attribute message of the UE on the dedicated link of the UE. Similarly, when service data of multiple UEs needs to be scheduled, the base station controller may send, with respect to a dedicated link of each UE, service attribute messages of corresponding UEs to the base station respectively by using different dedicated links, and the base station may receive the service attribute messages of the UEs on the dedicated links, and distinguish the service attribute messages of the UEs according to the different dedicated links of different UEs.

102. The base station obtains a user priority of the UE according to the received service attribute message and attribute information of each service corresponding to service data of the UE that is cached locally.

After receiving the service attribute message sent by the base station controller, the base station may learn, from the received service attribute message, the attribute information, such as a service type, a service priority, and a cached data size of service, of each service corresponding to the service data of the UE that is cached in the base station controller.

The base station may obtain, according to the service data of the UE that is cached locally, attribute information of each of the services corresponding to all service data of the UE, so as to obtain the user priority of the UE.

In an actual application, the base station may first obtain, by using deep packet inspection DPI, the service type of each service corresponding to the locally cached service data, and then obtain a service priority of the corresponding service by querying a table according to the obtained service type of the service.

Specifically, the user priority of the UE may be obtained by using the following algorithm:

> user priority=priority of service 1×cached data size of service 1+priority of service 2×cached data size of service 2+ . . . +priority of service N×cached data size of service N.

Alternatively, the user priority may be obtained by using cache delays of the services to modify the above algorithm, for example:

> user priority=priority of service 1×cached data size of service 1×(cache delay of service 1/maximum delay of service 1)+priority of service 2×cached data size of service 2×(cache delay of service 2/maximum delay of service 2)+ . . . +priority of service N×cached data size of service N×(cache delay of service N/maximum delay of service N).

Alternatively, the user priority of the UE may also be obtained by using a maximum absolute priority evaluation method, for example:

user priority=max(priority of service 1, priority of
service 2, . . . , priority of service N), that is, among service priorities of N services, a highest service priority is used as the user priority.

N is the current maximum number of services of the UE. In an actual application, the cache delays of the services and the maximum delays of the services may be carried in the service attribute message.

It may be understood that the user priority may be obtained by using another method, which is not limited herein.

103. The base station grants authorization to the UE by using the user priority of the UE.

By performing step 102, the base station can obtain the user priority of the UE, and then grant authorization to the UE. When service data of multiple UEs needs to be scheduled, a user scheduling priority of each UE may be computed by using a proportional fairness algorithm, and then authorization is granted to the UE, that is, an air interface bandwidth is granted to the UE.

Specifically, if service data of multiple UEs needs to be scheduled at this time, after obtaining the user scheduling priority of each UE, the base station may first grant authorization to a UE having a high user scheduling priority according to the user scheduling priorities; and if an available bandwidth of the air interface is greater than a cached data size of services of the high-priority user, grant a remaining bandwidth to a next-priority UE, and so on, until the bandwidth is granted completely.

The proportional fairness algorithm may be as follows:

user scheduling priority=user priority×air interface
channel environment of the UE/average transmit
rate of the UE.

Indeed, the user scheduling priority may also be obtained in another manner. For example, the user scheduling priority may be obtained by using a maximum throughput granting algorithm, where the algorithm may be as follows:

user scheduling priority=user priority×air interface
channel environment of the UE.

It may be understood that in the existing network mechanism, the base station is capable of detecting the air interface channel environment and average transmit rate of each UE within a coverage area of the base station in real time.

104. The base station grants authorization to each service of the UE according to the service priority of each service.

The base station grants, according to the service priority of each service of the UE, the authorization granted to the UE in step 103 to the service of the UE.

For example, the base station first grants authorization to a high-priority service; and if the bandwidth granted by the base station to the UE is greater than a cached data size of the high-priority service of the UE, grants a remaining bandwidth to a next-priority service of the UE, until the bandwidth granted by the base station to the UE is completely granted.

105. The base station sends authorization information of each service corresponding to the service data of the UE that is cached in the base station controller to the base station controller.

After granting the authorization to each service of the UE, the base station sends the authorization information of each service corresponding to the service data of the UE that is cached in the base station controller to the base station controller, so that the base station controller learns a specific authorization state of the service corresponding to the service data of the UE that is cached locally.

After the base station sends the authorization information of each service corresponding to the service data of the UE that is cached in the base station controller to the base station controller, the scheduling process is completed. The base station and the base station controller may send service data to the UE according to the authorization to each service of the UE, respectively.

It should be noted that the technical solution provided by the embodiment of the present invention is applicable to packet service data scheduling, and may be applied to an RAN subsystem, where base station LBO is implemented, of systems such as Global System for Mobile Communications (GSM, Global System for Mobile Communications), Universal Mobile Telecommunications System (UMTS, Universal Mobile Telecommunications System), and Time Division-Synchronous Code Division Multiple Access (TD-SCDMA, Time Division-Synchronous Code Division Multiple Access).

As can be seen from above, in the embodiment of the present invention, the base station cooperates with the base station controller, that is, the base station controller sends attribute information of each service corresponding to locally cached service data to the base station, so that the base station can grant authorization to each service, thereby implementing service data scheduling for a user when service data of the user is distributed and cached in both the base station and the base station controller. Meanwhile, in the embodiment of the present invention, the base station performs scheduling according to QoS requirements of the service while also considering the air interface channel environment, thereby obtaining a better air interface throughput while satisfying the user's QoS.

Figure 2:
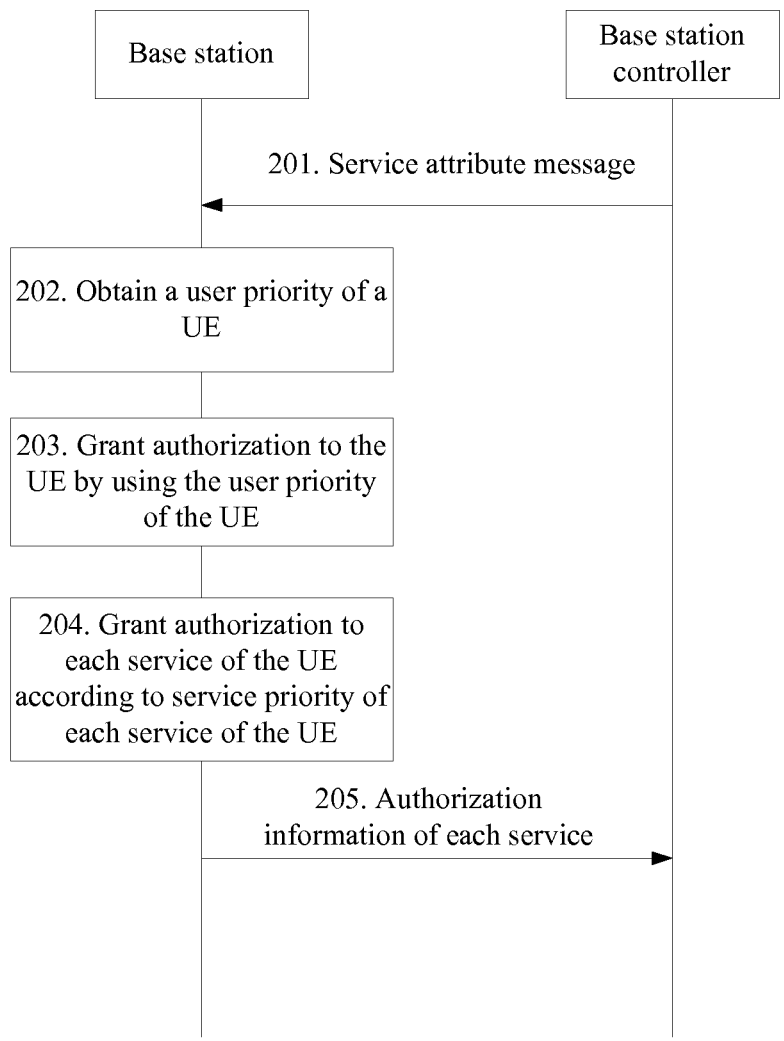
FIG. 2 is a schematic flowchart of a service data scheduling method according to another embodiment of the present invention.

In order to illustrate the technical solution of the present invention more clearly, the following describes the service data scheduling method in the embodiments of the present invention in detail. Referring to FIG. 2, a service data scheduling method according to another embodiment of the present invention includes the following steps.

201. A base station controller sends a service attribute message to a base station.

The base station controller sends attribute information (such as a service type, a service priority, and a cached data size of service) of each service corresponding to cached service data pertaining to a same UE to the base station.

It should be noted that the UE is a UE that requires the base station to schedule service data of the UE.

In an actual application, the base station controller may obtain, by using deep packet inspection DPI, the service type of each service corresponding to the service data of the UE that is cached locally, and then obtain a service priority of the corresponding service by querying a table according to the obtained service type of the service.

In an actual application, the base station controller may send the service attribute message of the UE to the base station by using a dedicated link of the UE, and the base station may receive the service attribute message of the UE on the dedicated link of the UE. Similarly, when service data of multiple UEs needs to be scheduled, the base station controller may send, with respect to a dedicated link of each UE, service attribute messages of corresponding UEs to the base station respectively by using different dedicated links, and the base station may receive the service attribute messages of the UEs on the dedicated links, and distinguish the service attribute messages of the UEs according to the different dedicated links of different UEs.

202. The base station obtains a user priority of the UE according to the received service attribute message and attribute information of each service corresponding to service data of the UE that is cached locally.

After receiving the service attribute message sent by the base station controller, the base station may learn, from the received service attribute message, the attribute information, such as a service type, a service priority, and a cached data size of service, of each service corresponding to the service data of the UE that is cached in the base station controller.

The base station may obtain, according to the service data of the UE that is cached locally, attribute information of each of the services corresponding to all service data of the UE, so as to obtain the user priority of the UE.

In an actual application, the base station may first obtain, by using deep packet inspection DPI, the service type of each service corresponding to the locally cached service data, and then obtain a service priority of the corresponding service by querying a table according to the obtained service type of the service.

Specifically, the user priority of the UE may be obtained by using the following algorithm:

user priority=priority of service 1×cached data size of service 1+priority of service 2×cached data size of service 2+ . . . +priority of service $N$×cached data size of service $N$.

Alternatively, the user priority may be obtained by using cache delays of the services to modify the above algorithm, for example:

user priority=priority of service 1×cached data size of service 1×(cache delay of service 1/maximum delay of service 1)+priority of service 2×cached data size of service 2×(cache delay of service 2/maximum delay of service 2)+ . . . +priority of service $N$×cached data size of service $N$×(cache delay of service $N$/maximum delay of service $N$).

Alternatively, the user priority of the UE may also be obtained by using a maximum absolute priority evaluation method, for example:

user priority=max(priority of service 1, priority of service 2, . . . , priority of service $N$), that is, among service priorities of N services, a highest service priority is used as the user priority.

N is the current maximum number of services of the UE. In an actual application, the cache delays of the services and the maximum delays of the services may be carried in the service attribute message.

It may be understood that the user priority may be obtained by using another method, which is not limited herein.

203. The base station grants authorization to the UE by using the user priority of the UE.

By performing step 202, the base station can obtain the user priority of the UE, and then grant authorization to the UE. When service data of multiple UEs needs to be scheduled, a user scheduling priority of each UE may be computed by using a proportional fairness algorithm, and then authorization is granted to the UE, that is, an air interface bandwidth is granted to the UE.

Specifically, if service data of multiple UEs needs to be scheduled at this time, after obtaining the user scheduling priority of each UE, the base station may first grant authorization to a UE having a high user scheduling priority according to the user scheduling priorities; and if an available bandwidth of the air interface is greater than a cached data size of services of the high-priority user, grant a remaining bandwidth to a next-priority UE, and so on, until the bandwidth is granted completely.

The proportional fairness algorithm may be as follows:

user scheduling priority=user priority×air interface channel environment of the UE/average transmit rate of the UE.

Indeed, the user scheduling priority may also be obtained in another manner. For example, the user scheduling priority may be obtained by using a maximum throughput granting algorithm, where the algorithm may be as follows:

user scheduling priority=user priority×air interface channel environment of the UE.

It may be understood that in the existing network mechanism, the base station is capable of detecting the air interface channel environment and average transmit rate of each UE within a coverage area of the base station in real time.

204. The base station grants authorization to each service of the UE according to the service priority of each service.

The base station grants, according to the service priority of each service of the UE, the authorization granted to the UE in step 203 to the service of the UE.

For example, the base station first grants authorization to a high-priority service; and if the bandwidth granted by the base station to the UE is greater than a cached data size of the high-priority service of the UE, grants a remaining bandwidth to a next-priority service of the UE, until the bandwidth granted by the base station to the UE is completely granted.

205. The base station sends authorization information of each service corresponding to the service data of the UE that is cached in the base station controller to the base station controller.

After granting the authorization to each service of the UE, the base station sends the authorization information of each service corresponding to the service data of the UE that is cached in the base station controller to the base station controller, so that the base station controller learns a specific authorization state of the service corresponding to the service data of the UE that is cached locally.

After the base station sends the authorization information of each service corresponding to the service data of the UE that is cached in the base station controller to the base station controller, the scheduling process is completed. The base station and the base station controller may send service data according to the authorization of the service of the UE.

It should be noted that the technical solution provided by the embodiment of the present invention is applicable to packet service data scheduling, and may be applied to an RAN subsystem, where base station LBO is implemented, of systems such as GSM, UMTS, and TD-SCDMA.

As can be seen from above, in the embodiment of the present invention, the base station cooperates with the base station controller, that is, the base station controller sends attribute information of each service corresponding to locally cached service data to the base station, so that the base station can grant authorization to each service, thereby implementing service data scheduling for a user when service data of the user is distributed and cached in both the base station and the base station controller. Meanwhile, in the embodiment of the present invention, the base station performs scheduling according to QoS requirements of the service while also considering the air interface channel environment, thereby obtaining a better air interface throughput while satisfying the user's QoS.

Figure 3:
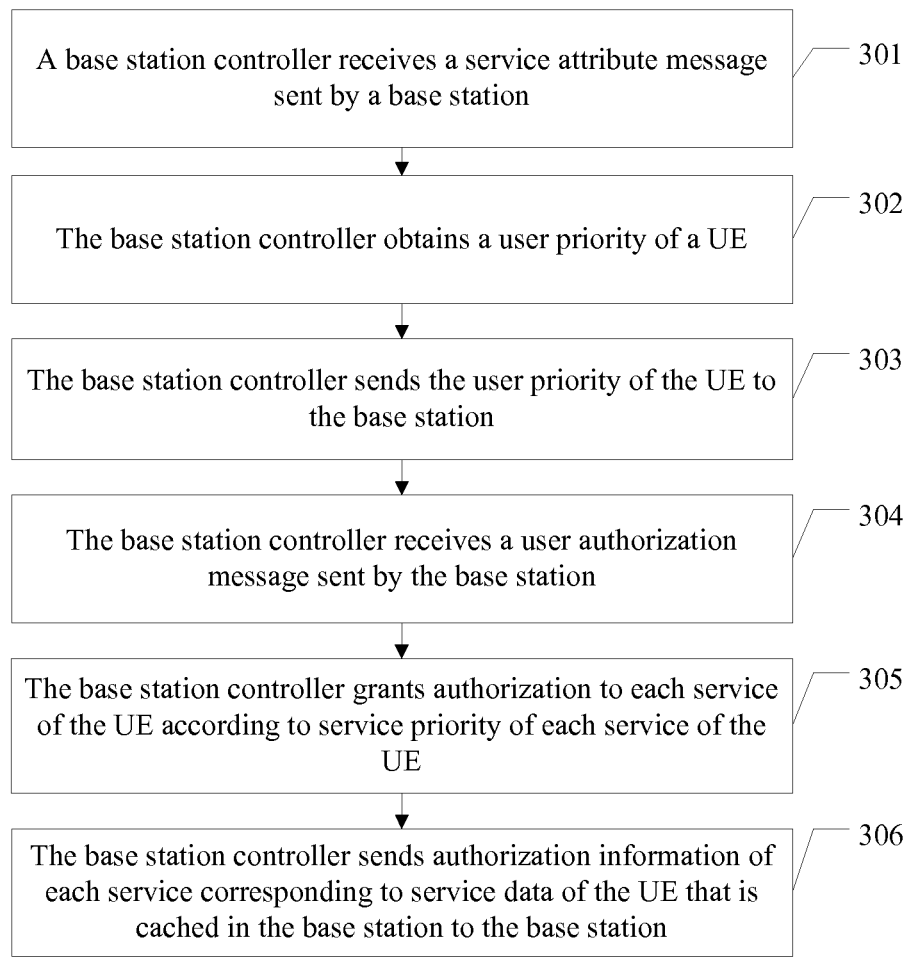
FIG. 3 is a schematic flowchart of a service data scheduling method according to still another embodiment of the present invention.

The scheduling process of the foregoing embodiments is mainly completed in the base station. The following describes a service data scheduling method where a service scheduling process is completed in a base station controller. Referring to FIG. 3, a service data scheduling method according to another embodiment of the present invention includes the following steps.

301. A base station controller receives a service attribute message sent by a base station.

The service attribute message includes attribute information (such as a service type, a service priority, and a cached data size of service) of each service corresponding to service data that is pertaining to a same UE and cached in the base station.

It should be noted that the UE is a UE that requires the base station controller to schedule service data of the UE.

In an actual application, the base station may send the service attribute message of the UE to the base station controller by using a dedicated link of the UE, and the base station controller may receive the service attribute message of the UE on the dedicated link of the UE. Similarly, when service data of multiple UEs needs to be scheduled, the base station may send, with respect to a dedicated link of each UE, service attribute messages of corresponding UEs to the base station controller respectively by using different dedicated links, and the base station controller may receive the service attribute messages of the UEs on the dedicated links, and distinguish the service attribute messages of the UEs according to the different dedicated links of different UEs.

302. The base station controller computes, according to the received attribute information and attribute information of each service corresponding to locally cached service data, a user priority of the UE that the service is pertaining to.

After receiving the service attribute message sent by the base station, the base station controller may learn, from the received service attribute message, the attribute information, such as a service type, a service priority, and a cached data size of service, of each service corresponding to the service data of the UE that is cached in the base station.

The base station controller may obtain, according to the service data of the UE that is cached locally, attribute information of each of the services corresponding to all service data of the UE, so as to obtain the user priority of the UE.

In an actual application, the base station may first obtain, by using deep packet inspection DPI, the service type of each service corresponding to the locally cached service data, and then obtain a service priority of the corresponding service by querying a table according to the obtained service type of the service.

Specifically, the user priority of the UE may be obtained by using the following algorithm:

user priority=priority of service 1×cached data size of service 1+priority of service 2×cached data size of service 2+ . . . +priority of service N×cached data size of service N.

Alternatively, the user priority may be obtained by using cache delays of the services to modify the above algorithm, for example:

user priority=priority of service 1×cached data size of service 1×(cache delay of service 1/maximum delay of service 1)+priority of service 2×cached data size of service 2×(cache delay of service 2/maximum delay of service 2)+ . . . +priority of service N×cached data size of service N×(cache delay of service N/maximum delay of service N).

Alternatively, the user priority of the UE may also be obtained by using a maximum absolute priority evaluation method, for example:

user priority=max(priority of service 1, priority of service 2, . . . , priority of service N), that is, among service priorities of N services, a highest service priority is used as the user priority.

N is the current maximum number of services of the UE. In an actual application, the cache delays of the services and the maximum delays of the services may be carried in the service attribute message.

It may be understood that the user priority may be obtained by using another method, which is not limited herein.

303. The base station controller sends the user priority of the UE to the base station.

The base station controller sends the user priority of the UE that is computed and obtained in step 302 to the base station, so that the base station grants authorization to the UE by using the user priority, that is, grants an air interface bandwidth to the UE.

304. The base station controller receives a user authorization message sent by the base station.

The user authorization message includes authorization information of the UE, that is, a specific state of the authorization granted by the base station to the UE.

305. The base station controller grants authorization to each service of the UE according to the service priority of each service.

The base station controller may learn, according to the received user authorization message of the UE, the authorization granted by the base station to the UE; and the base station controller may grant, according to the service priority of each service of the UE, the authorization granted by the base station to the UE to the service, where a process may specifically be that: the base station controller first grants authorization to a high-priority service; and if the bandwidth granted by the base station to the UE is greater than a cached data size of the high-priority service of the UE, the base station controller grants a remaining bandwidth to a next-priority service of the UE, until the bandwidth granted by the base station to the UE is completely granted.

306. The base station controller sends authorization information of each service corresponding to the service data of the UE that is cached in the base station to the base station.

After granting the authorization to each service of the UE, the base station controller sends the authorization information of each service corresponding to the service data of the UE that is cached in the base station to the base station, so that the base station learns a specific authorization state of the service corresponding to the service data of the UE that is cached locally.

After the base station controller sends the authorization information of each service corresponding to the service data of the UE that is cached in the base station to the base station, the scheduling process is completed. The base station and the base station controller may send service data according to the authorization of the service of the UE.

It should be noted that the technical solution provided by the embodiment of the present invention is applicable to packet service data scheduling, and may be applied to an RAN subsystem, where base station LBO is implemented, of systems such as GSM, UMTS, and TD-SCDMA.

As can be seen from above, in the embodiment of the present invention, the base station cooperates with the base station controller, that is, the base station sends attribute information of each service corresponding to locally cached service data to the base station controller, so that the base station controller can grant authorization to each service, thereby implementing service data scheduling for a user when service data of the user is distributed and cached in both the base station and the base station controller.

Figure 4:
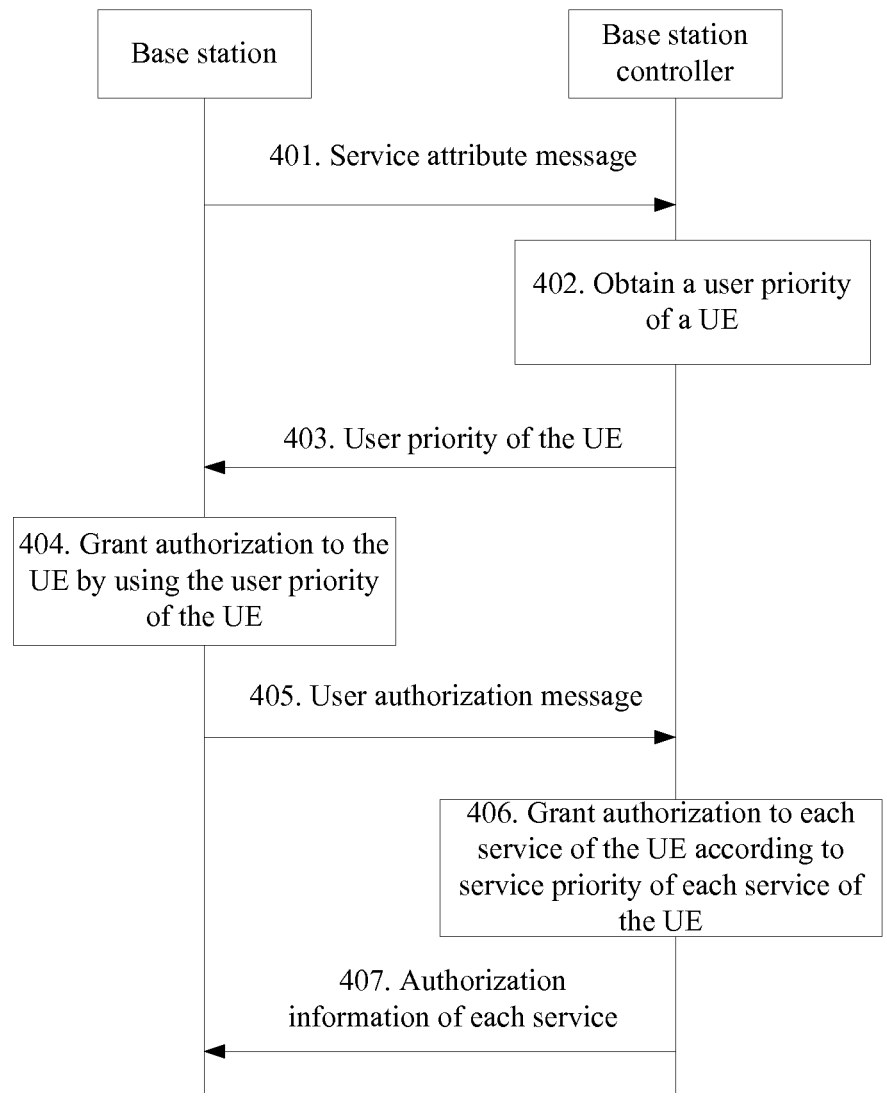
FIG. 4 is a schematic flowchart of a service data scheduling method according to still another embodiment of the present invention.

In order to illustrate the technical solution of the present invention more clearly, the following describes the service data scheduling method in the embodiments of the present invention in detail. Referring to FIG. 4, a service data scheduling method according to another embodiment of the present invention includes the following steps.

401. A base station sends a service attribute message to a base station controller.

The base station sends attribute information (such as service a type, a service priority, and a cached data size of service) of each service corresponding to cached service data pertaining to a same UE to the base station controller.

It should be noted that the UE is a UE that requires the base station controller to schedule service data of the UE.

In an actual application, the base station may obtain, by using deep packet inspection DPI, the service type of each service corresponding to the service data of the UE that is cached locally, and then obtain a service priority of the corresponding service by querying a table according to the obtained service type of the service.

In an actual application, the base station may send the service attribute message of the UE to the base station controller by using a dedicated link of the UE, and the base station controller may receive the service attribute message of the UE on the dedicated link of the UE. Similarly, when service data of multiple UEs needs to be scheduled, the base station may send, with respect to a dedicated link of each UE, service attribute messages of corresponding UEs to the base station controller respectively by using different dedicated links, and the base station controller may receive the service attribute messages of the UEs on the dedicated links, and distinguish the service attribute messages of the UEs according to the different dedicated links of different UEs.

402. The base station controller obtains a user priority of the UE according to the received service attribute message and attribute information of each service corresponding to service data of the UE that is cached locally.

After receiving the service attribute message sent by the base station, the base station controller may learn, from the received service attribute message, the attribute information, such as a service type, a service priority, and a cached data size of service, of each service corresponding to the service data of the UE that is cached in the base station.

The base station controller may obtain, according to the service data of the UE that is cached locally, attribute information of each of the services corresponding to all service data of the UE, so as to obtain the user priority of the UE.

In an actual application, the base station controller may first obtain, by using deep packet inspection DPI, the service type of each service corresponding to the locally cached service data, and then obtain a service priority of the corresponding service by querying a table according to the obtained service type of the service.

Specifically, the user priority of the UE may be obtained by using the following algorithm:

user priority=priority of service 1×cached data size of service 1+priority of service 2×cached data size of service 2+ . . . +priority of service N×cached data size of service N.

Alternatively, the user priority may be obtained by using cache delays of the services to modify the above algorithm, for example:

user priority=priority of service 1×cached data size of service 1×(cache delay of service 1/maximum delay of service 1)+priority of service 2×cached data size of service 2×(cache delay of service 2/maximum delay of service 2)+ . . . +priority of service N×cached data size of service N×(cache delay of service N/maximum delay of service N).

Alternatively, the user priority of the UE may also be obtained by using a maximum absolute priority evaluation method, for example:

user priority=max(priority of service 1, priority of service 2, . . . , priority of service N), that is, among service priorities of N services, a highest service priority is used as the user priority.

N is the current maximum number of services of the UE. In an actual application, the cache delays of the services and the maximum delays of the services may be carried in the service attribute message.

It may be understood that the user priority may be obtained by using another method, which is not limited herein.

403. The base station controller sends the user priority of the UE to the base station.

The base station controller sends the user priority of the UE obtained in step 402 to the base station, so that the base station grants authorization to the UE by using the user priority.

404. The base station grants authorization to the UE by using the user priority of the UE.

After receiving the user priority of the UE sent by the base station controller, the base station may grant authorization to the UE. When service data of multiple UEs needs to be scheduled, a user scheduling priority of each UE may be computed by using a proportional fairness algorithm, and then authorization is granted to the UE, that is, an air interface bandwidth is granted to the UE.

Specifically, if service data of multiple UEs needs to be scheduled at this time, after obtaining the user scheduling priority of each UE, the base station may first grant authorization to a UE having a high user scheduling priority according to the user scheduling priorities; and if an available bandwidth of the air interface is greater than a cached data size of services of the high-priority user, grant a remaining bandwidth to a next-priority UE, and so on, until the bandwidth is granted completely.

The proportional fairness algorithm may be as follows:

user scheduling priority=user priority×air interface channel environment of the UE/average transmit rate of the UE.

Indeed, the user scheduling priority may also be obtained in another manner. For example, the user scheduling priority may be obtained by using a maximum throughput granting algorithm, where the algorithm may be as follows:

user scheduling priority=user priority×air interface channel environment of the UE.

It may be understood that in the existing network mechanism, the base station is capable of detecting the air interface channel environment and average transmit rate of each UE within a coverage area of the base station in real time.

405. The base station sends a user authorization message to the base station controller.

After performing step 404, the base station sends authorization information of the UE to the base station controller by using the user authorization message, so that the base station controller learns a specific state of the authorization granted by the base station to the UE.

406. The base station controller grants authorization to each service of the UE according to the service priority of each service.

The base station controller may learn, according to the received user authorization message of the UE, the authorization granted by the base station to the UE; and the base station controller may grant, according to the service priority of each service of the UE, the authorization granted by the base station to the UE to the service, where a process may specifically be that: the base station controller first grants authorization to a high-priority service; and if the bandwidth granted by the base station to the UE is greater than a cached data size of the high-priority service of the UE, the base station controller grants a remaining bandwidth to a next-priority service of the UE, until the bandwidth granted by the base station to the UE is completely granted.

407. The base station controller sends authorization information of each service corresponding to the service data of the UE that is cached in the base station to the base station.

After granting the authorization to each service of the UE, the base station controller sends the authorization information of each service corresponding to the service data of the UE that is cached in the base station to the base station, so that the base station learns a specific authorization state of the service corresponding to the service data of the UE that is cached locally.

After the base station controller sends the authorization information of each service corresponding to the service data of the UE that is cached in the base station to the base station, the scheduling process is completed. The base station and the base station controller may send service data according to the authorization of the service of the UE.

It should be noted that the technical solution provided by the embodiment of the present invention is applicable to packet service data scheduling, and may be applied to an RAN subsystem, where base station LBO is implemented, of systems such as GSM, UMTS, and TD-SCDMA.

As can be seen from above, in the embodiment of the present invention, the base station cooperates with the base station controller, that is, the base station sends attribute information of each service corresponding to locally cached service data to the base station controller, so that the base station controller can grant authorization to each service, thereby implementing service data scheduling for a user when service data of the user is distributed and cached in both the base station and the base station controller. Meanwhile, in the embodiment of the present invention, the base station performs scheduling according to QoS requirements of the service while also considering the air interface channel environment, thereby obtaining a better air interface throughput while satisfying the user's QoS.

Figure 5:
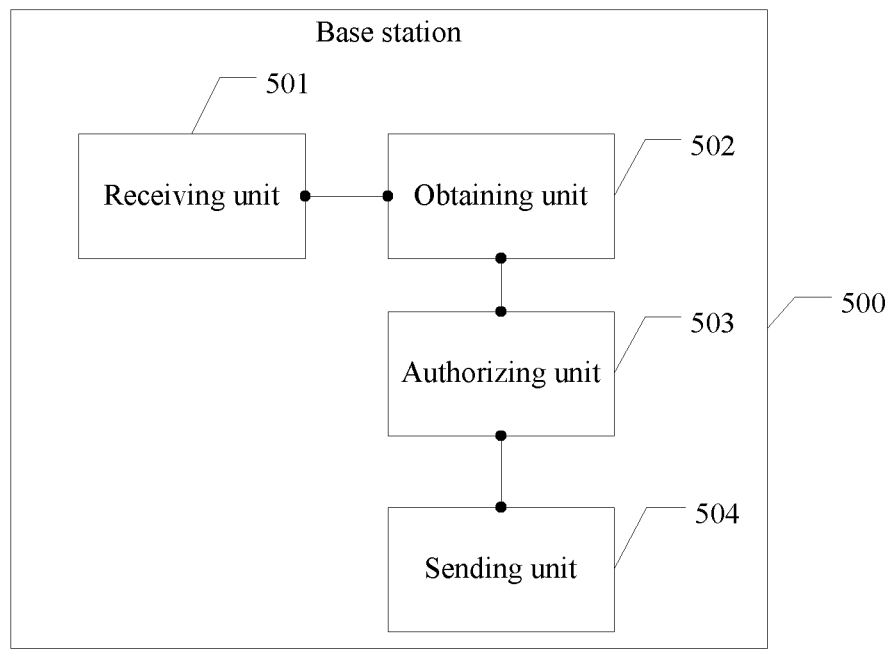
FIG. 5 is a schematic structural diagram of a base station according to an embodiment of the present invention.

The following describes a base station according to an embodiment of the present invention. Referring to FIG. 5, a base station 500 according to an embodiment of the present invention includes the following:

a receiving unit 501 is configured to receive a service attribute message sent by a base station controller, where the service attribute message includes attribute information of each service corresponding to service data that is pertaining to a same UE and cached in the base station controller, and the attribute information may include a service type, a service priority, and a cached data size of service; and an obtaining unit 502 is configured to obtain a user priority of the UE according to the service attribute message received by the receiving unit 501 and attribute information of each services corresponding to service data of the UE that is cached locally.

The obtaining unit 502 may obtain, according to the service data of the UE that is cached locally, attribute information of each of the services corresponding to all service data of the UE, so as to obtain the user priority of the UE.

In an actual application, the base station 500 may further include a parsing and obtaining unit, configured to obtain, by using deep packet inspection DPI, the service type of each service corresponding to the service data of the UE that is cached locally, and obtain a service priority of the corresponding service by querying a table according to the obtained service type of the service.

Specifically, the obtaining unit 502 may obtain the user priority of the UE by using the following algorithm:

user priority=priority of service 1×cached data size of service 1+priority of service 2×cached data size of service 2+ . . . +priority of service $N$×cached data size of service $N$.

Alternatively, the obtaining unit 502 may obtain the user priority by using cache delays of the services to modify the above algorithm, for example:

user priority=priority of service 1×cached data size of service 1×(cache delay of service 1/maximum delay of service 1)+priority of service 2×cached data size of service 2×(cache delay of service 2/maximum delay of service 2)+ . . . +priority of service $N$×cached data size of service $N$×(cache delay of service $N$/maximum delay of service $N$).

Alternatively, the obtaining unit 502 may also obtain the user priority of the UE by using a maximum absolute priority evaluation method, for example:

user priority=max(priority of service 1, priority of service 2, . . . , priority of service $N$), that is, among service priorities of N services, a highest service priority is used as the user priority.

N is the current maximum number of services of the UE. In an actual application, the cache delays of the services and the maximum delays of the services may be carried in the service attribute message.

It may be understood that the user priority may be obtained by using another method, which is not limited herein.

An authorizing unit 503 is configured to grant authorization to the UE by using the user priority of the UE obtained by the obtaining unit 502.

When service data of multiple UEs needs to be scheduled, the authorizing unit 503 may further obtain a user scheduling priority of each UE by using a proportional fairness algorithm, and then grant authorization to the UE, that is, grant an air interface bandwidth to the UE. The authorizing unit 503 may first grant, according to the user scheduling priorities, authorization (that is, grant a bandwidth) to a UE having a high user scheduling priority; and if an available bandwidth of the air interface is greater than a cached data size of services of the high-priority user, grant a remaining bandwidth to a next-priority UE, and so on, until the bandwidth is granted completely.

The proportional fairness algorithm may be as follows:

user scheduling priority=user priority×air interface channel environment of the UE/average transmit rate of the UE.

Indeed, the user scheduling priority may also be obtained in another manner. For example, the user scheduling priority may be obtained by using a maximum throughput granting algorithm, where the algorithm may be as follows:

user scheduling priority=user priority×air interface channel environment of the UE.

It may be understood that in the existing network mechanism, the base station 500 is capable of detecting the air interface channel environment and average transmit rate of each UE within a coverage area of the base station in real time.

The authorizing unit 503 is further configured to grant the authorization granted to the UE to the service of the UE according to the service priority of each service of the UE.

For example, the authorizing unit 503 first grants authorization to a high-priority service; and if the bandwidth granted to the UE is greater than a cached data size of the high-priority service of the UE, grants a remaining bandwidth to a next-priority service of the UE, until the bandwidth granted by the base station to the UE is completely granted.

A sending unit 504 is configured to send authorization information of each service corresponding to the service data of the UE that is cached in the base station controller to the base station controller.

After the authorizing unit 503 grants the authorization to each service of the UE, the base station 500 may send, by using the sending unit 504, the authorization information of each service corresponding to the service data of the UE that is cached in the base station controller to the base station controller, so that the base station controller learns a specific authorization state of the service corresponding to the service data of the UE that is cached locally.

It should be noted that the base station 500 in this embodiment may be the base station in the foregoing method embodiments, and may be used to implement all technical solutions in the foregoing method embodiments, where functions of functional modules thereof may be specifically implemented according to the methods in the foregoing method embodiments, and reference may be made to relevant description in the foregoing embodiments for specific implementation processes thereof, which are not described herein again.

As can be seen from above, in the embodiment of the present invention, the base station cooperates with the base station controller, that is, the base station controller sends attribute information of each service corresponding to locally cached service data to the base station, so that the base station can grant authorization to each service, thereby implementing service data scheduling for a user when service data of the user is distributed and cached in both the base station and the base station controller.

Figure 6:
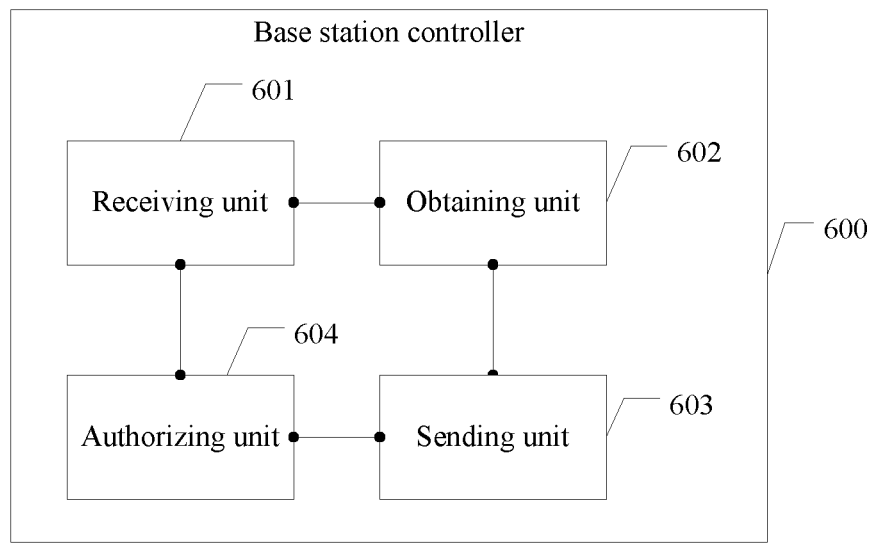
FIG. 6 is a schematic structural diagram of a base station controller according to an embodiment of the present invention.

The following describes a base station controller according to an embodiment of the present invention. Referring to FIG. 6, a base station controller 600 according to an embodiment of the present invention includes the following:

a receiving unit 601 is configured to receive a service attribute message sent by a base station, where the service attribute message includes attribute information of each service corresponding to service data that is pertaining to a same UE and cached in the base station, and the attribute information may include a service type, a service priority, and a cached data size of service; and an obtaining unit 602 is configured to obtain a user priority of the UE according to the service attribute message received by the receiving unit 601 and attribute information of each service corresponding to service data of the UE that is cached locally.

The obtaining unit 602 may obtain, according to the service data of the UE that is cached locally, attribute information of each of the services corresponding to all service data of the UE, so as to obtain the user priority of the UE.

In an actual application, the base station controller 600 may further include a parsing and obtaining unit, configured to obtain, by using deep packet inspection DPI, the service type of each service corresponding to the service data of the UE that is cached locally, and obtain a service priority of the corresponding service by querying a table according to the obtained service type of the service.

A sending unit 603 is configured to send the user priority of the UE that is obtained by the obtaining unit 602 to the base station.

The sending unit 603 sends the user priority of the UE obtained by the obtaining unit 602 to the base station, so that the base station grants authorization to the UE by using the user priority.

The receiving unit 601 is further configured to receive a user authorization message sent by the base station.

The user authorization message includes authorization information of the UE, that is, a specific state of the authorization granted by the base station to the UE.

An authorizing unit 604 is configured to grant authorization to each service of the UE according to the service priority of each service of the UE The authorizing unit 604 may learn, according to the received user authorization message of the UE, the authorization granted by the base station to the UE; and the authorizing unit 604 may grant, according to the service priority of each service of the UE, the authorization granted by the base station to the UE to the service, where a process may specifically be that: the authorizing unit 604 first grants authorization to a high-priority service; and if the bandwidth granted by the base station to the UE is greater than a cached data size of the high-priority service of the UE, the authorizing unit 604 grants a remaining bandwidth to a next-priority service of the UE, until the bandwidth granted by the base station to the UE is completely granted.

The sending unit 603 is further configured to send authorization information of each service corresponding to the service data of the UE that is cached in the base station to the base station.

After the authorizing unit 604 grants the authorization to each service of the UE, the base station controller 600 may send, by using the sending unit 603, the authorization information of each service corresponding to the service data of the UE that is cached in the base station to the base station, so that the base station learns a specific state of the authorization granted by the base station controller 600 to each service corresponding to the service data of the UE that is cached in the base station.

It should be noted that the base station controller 600 in this embodiment may be the base station controller in the foregoing method embodiments, and may be used to implement all technical solutions in the foregoing method embodiments, where functions of functional modules thereof may be specifically implemented according to the methods in the foregoing method embodiments, and reference may be made to relevant description in the foregoing embodiments for specific implementation processes thereof, which are not described herein again.

As can be seen from above, in the embodiment of the present invention, the base station cooperates with the base station controller, that is, the base station sends attribute information of each service corresponding to locally cached service data to the base station controller, so that the base station controller can grant authorization to each service, thereby implementing service data scheduling for a user when service data of the user is distributed and cached in both the base station and the base station controller.

It may be clearly understood by a person skilled in the art that, for the purpose of convenient and brief description, reference may be made to the corresponding process in the foregoing method embodiments for detailed working processes of the foregoing system, apparatus and unit, which are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

Detailed above are a service data scheduling method and related devices. A person of ordinary skill in the art may make variations to the implementation manners and application scope of the present invention according to the idea of the embodiments of the present invention. Therefore, the specification shall not be construed as a limitation to the present invention.

What is claimed is:

1. A service data scheduling method, comprising:
    receiving, by a base station, a service attribute message sent by a base station controller, wherein the service attribute message comprises attribute information of each service corresponding to service data pertaining to a same user equipment (UE) and cached in the base station controller, and the attribute information comprises a service type and a service priority;
    obtaining, by the base station, a user priority of the UE according to the service attribute message and attribute information of each service corresponding to service data of the UE cached locally in the base station;
    granting, by the base station, authorization to the UE according to the user priority of the UE;
    granting, by the base station, authorization to each service of the UE according to the authorization granted to the UE and the service priority of each service of the UE; and
    sending, by the base station, authorization information of each service to the base station controller, wherein the authorization information of each service corresponding to the service data of the UE that is cached in the base station controller.

2. The method according to claim 1, wherein before the obtaining a user priority of the UE according to the service attribute message and attribute information of each service corresponding to service data of the UE that is cached locally in a base station, the method further comprises:
    obtaining, by the base station using deep packet inspection DPI, the service type of each service corresponding to the service data of the UE that is cached locally in the base station; and
    obtaining, by the base station, the service priority of the corresponding service by querying a table according to the obtained service type.

3. The method according to claim 1, wherein the obtaining a user priority of the UE according to the service attribute message and attribute information of each service corresponding to service data of the UE that is cached locally in the base station, comprises:
    using a highest service priority among service priorities of the services of the UE as the user priority of the UE.

4. The method according to claim 1, wherein the attribute information sent by the base station controller further comprises cached data size of service, and the obtaining a user priority of the UE according to the service attribute message and attribute information of each service corresponding to service data of the UE that is cached locally in a base station comprises:

user priority of the UE=priority of service 1×cached
    data size of service 1+priority of service
    2×cached data size of service 2+ . . . +priority of
    service N×cached data size of service N, wherein N is the number of services of the UE.

5. The method according to claim 1, wherein the attribute information sent by the base station controller further comprises cached data size of service, cache delay of service, and maximum delay of service, and the obtaining a user priority of the UE according to the service attribute message and attribute information of each service corresponding to service data of the UE that is cached locally in a base station comprises:

user priority of the UE=priority of service 1×cached
    data size of service 1×(cache delay of service
    1/maximum delay of service 1)+priority of service 2×cached data size of service 2×(cache
    delay of service 2/maximum delay of service
    2)+ . . . +priority of service N×cached data size of
    service N×(cache delay of service N/maximum
    delay of service N), wherein N is the number of services of the UE.

6. The method according to claim 1, wherein the UE is a UE that requires the base station and the base station controller to schedule service data.

7. The method according to claim 1, wherein the granting authorization to the UE according to the user priority of the UE comprises:
    computing a user scheduling priority of the UE, and granting authorization to the UE according to the user scheduling priority.

8. The method according to claim 7, wherein:

user scheduling priority of the UE=user priority of the
    UE×air interface channel environment of the
    UE/average transmit rate of the UE;

or user scheduling priority of the UE=user priority of the UE×air interface channel environment of the UE.

9. A service data scheduling method, comprising:
receiving, by a base station controller, a service attribute message sent by a base station, wherein the service attribute message comprises attribute information of each service corresponding to service data pertaining to a same user equipment (UE) and cached in the base station, and the attribute information comprises service a type and a service priority;
obtaining, by the base station controller, a user priority of the UE according to the received service attribute message and attribute information of each service corresponding to service data of the UE cached locally in the base station controller;
sending, by the base station controller, the user priority of the UE to the base station, so that the base station grants authorization to the UE by using the user priority;
receiving, by the base station controller, a user authorization message sent by the base station, wherein the user authorization message comprises authorization information of the UE;
granting, by the base station controller, authorization to each service of the UE according to the authorization information of the UE and the service priority of each service of the UE; and
sending, by the base station controller, authorization information of each service to the base station, wherein the authorization information of each service corresponding to the service data of the UE that is cached in the base station.

10. The method according to claim 9, wherein before the computing a user priority of the UE according to the received service attribute message and attribute information of each service corresponding to service data of the UE that is cached locally in the base station controller, the method further comprises:
obtaining, by the base station controller using deep packet inspection DPI, the service type of each service corresponding to the service data of the UE that is cached locally in the base station controller; and
obtaining, by the base station controller, the service priority of the corresponding service by querying a table according to the obtained service type.

11. The method according to claim 9, wherein the obtaining a user priority of the UE according to the service attribute message and attribute information of each service corresponding to service data of the UE that is cached locally in the base station controller comprises:
using a highest service priority among service priorities of the services of the UE as the user priority of the UE.

12. The method according to claim 9, wherein the attribute information sent by the base station further comprises cached data size of service, and the obtaining a user priority of the UE according to the service attribute message and attribute information of each service corresponding to service data of the UE that is cached locally in the base station controller comprises:

user priority of the UE=priority of service 1×cached data size of service 1+priority of service 2×cached data size of service 2+ . . . +priority of service N×cached data size of service N, wherein N is the number of services of the UE.

13. The method according to claim 9, wherein the attribute information sent by the base station further comprises cached data size of service, cache delay of service, and maximum delay of service, and the obtaining a user priority of the UE according to the service attribute message and attribute information of each service corresponding to service data of the UE that is cached locally in the base station controller comprises:

user priority of the UE=priority of service 1×cached data size of service 1×(cache delay of service 1/maximum delay of service 1)+priority of service 2×cached data size of service 2×(cache delay of service 2/maximum delay of service 2)+ . . . +priority of service N×cached data size of service N×(cache delay of service N/maximum delay of service N), wherein N is the number of services of the UE.

14. The method according to claim 9, wherein the UE is a UE that requires the base station and the base station controller to schedule service data.

15. The method according to claim 9, wherein the granting authorization to the UE by using the user priority of the UE comprises:
computing a user scheduling priority of the UE, and granting authorization to the UE according to the user scheduling priority.

16. The method according to claim 15, wherein:

user scheduling priority of the UE=user priority of the UE×air interface channel environment of the UE/average transmit rate of the UE;

or user scheduling priority of the UE=user priority of the UE×air interface channel environment of the UE.

17. A base station, comprising:
a receiving unit, configured to receive a service attribute message sent by a base station controller, wherein the service attribute message comprises attribute information of each service corresponding to service data pertaining to a same user equipment (UE) and cached in the base station controller, and the attribute information comprises a service type and a service priority;
an obtaining unit, configured to obtain a user priority of the UE according to the service attribute message received by the receiving unit and attribute information of each service corresponding to service data of the UE cached locally;
an authorizing unit, configured to grant authorization to the UE according to the user priority of the UE obtained by the obtaining unit, and configured to grant authorization to each service of the UE according to the authorization granted to the UE and each service priority of the service of the UE; and
a sending unit, configured to send authorization information of each service to the base station controller, wherein the authorization information of each service corresponding to the service data of the UE that is cached in the base station controller.

18. The base station according to claim 17, further comprising:
a parsing and obtaining unit, configured to obtain, by using deep packet inspection DPI, the service type of each service corresponding to the service data of the UE that is cached locally in the base station, and obtain the service priority of the corresponding service by querying a table according to the service type.

19. A base station controller, comprising:

a receiving unit, configured to receive a service attribute message sent by a base station, wherein the service attribute message comprises attribute information of each service corresponding to service data pertaining to a same user equipment (UE) and cached in the base station, and the attribute information comprises service a type and a service priority;

an obtaining unit, configured to obtain a user priority of the UE according to the attribute information received by the receiving unit and attribute information of each service corresponding to service data of the UE cached locally;

a sending unit, configured to send the user priority of the UE that is obtained by the obtaining unit to the base station;

the receiving unit, further configured to receive a user authorization message sent by the base station, wherein the user authorization message comprises authorization information of the UE;

an authorizing unit, configured to grant authorization to each service of the UE according to the authorization information of the UE and the service priority of each service of the UE; and the sending unit, further configured to send authorization information of each service to the base station, wherein the authorization information of each service corresponding to the service data of the UE that is cached in the base station.

20. The base station controller according to claim 19, further comprising:

a parsing and obtaining unit, configured to obtain, by using deep packet inspection DPI, the service type of each service corresponding to the service data of the UE that is cached locally in the base station controller, and obtain the service priority of the corresponding service by querying a table according to the service type.

* * * * *